United States Patent [19]
Yang

[11] Patent Number: 5,204,790
[45] Date of Patent: Apr. 20, 1993

[54] DIGITAL SIGNAL RECORDING CIRCUIT FOR DIGITAL VIDEO CASSETTE TAPE RECORDER

[75] Inventor: Chang-jin Yang, Seoul, Rep. of Korea

[73] Assignee: Samsung Electronics Co., Ltd., Kyunggi, Rep. of Korea

[21] Appl. No.: 661,266

[22] Filed: Feb. 27, 1991

[30] Foreign Application Priority Data

Feb. 28, 1990 [KR] Rep. of Korea ............... 90-2613

[51] Int. Cl.$^5$ ............................................. G11B 5/09
[52] U.S. Cl. ..................................... 360/68; 360/39
[58] Field of Search ................. 360/29, 30, 32, 36.1, 360/36.2, 39, 40, 47, 51, 52, 65, 67, 68

[56] References Cited
U.S. PATENT DOCUMENTS 4,367,495  1/1983  Mita et al. ......................... 360/39
4,635,140  1/1987  Uchimi ............................. 360/40

*Primary Examiner*—David Mis
*Attorney, Agent, or Firm*—Rothwell, Figg, Ernst & Kurz

[57] ABSTRACT

A digital signal recording circuit compensates for the deterioration of a digital signal that occurs during recording and reduces the occurrence of bit errors during playback in a digital signal recording and playback apparatus. The circuit includes a read/write circuit which records and reads digital signals to and from a recording medium and which relays its data to a playback circuit for reproducing digital signals read from the recording medium. The circuit also provides an input signal processing circuit which converts along signals into processed digital signals for recording and a compensation circuit which both amplifies the digital signal for recording and compensates for bit deterioration caused by frequency variations in the processed digital signals.

11 Claims, 2 Drawing Sheets

DIGITAL SIGNAL RECORDING CIRCUIT FOR DIGITAL VIDEO CASSETTE TAPE RECORDER

FIELD OF THE INVENTION

The present invention relates generally to an apparatus for recording digital signals onto a recording medium and/or for reproducing the digital signals recorded on the medium and, more particularly, is directed to a digital signal recording circuit for the compensation of digital signal deterioration during recording so that bit errors do not occur during the playback.

BACKGROUND OF THE INVENTION

Digital signal recording and playback apparatus is generally known for preventing some of the existing problems of the conventional analog type recording apparatus in which information errors are generated by certain circuit elements and the effects of external noise. In doing so, information is precisely reproduced, as in the cases of digital audio tape recorders, digital video tape recorders and the like.

The digital apparatus has been developed for the purpose of lowering the rate of errors, carrying out an effective recording and playback operation, providing so that digital signals of precise waveform and of constant level to be recorded can be reproduced, and ensuring against any discrepancies among the digital signal bits being reproduced during playback.

However, the conventional digital signal recording and playback apparatus as known heretofore gives no consideration to the fact that, during recording, signal strength varies over pulse frequency of the digital signal. Also, because the digital signals are reproduced and then corrected and compensated during the playback operation rather than real-time, the playback circuit is therefore overly complicated and the bit error rate is increased as the signal frequency increases during both recording and playback operations.

SUMMARY OF THE INVENTION

Accordingly, it is an object of this invention to provide a digital signal recording circuit which is able to reduce the occurrence of errors during playback by compensating for the deterioration of the digital signal during the recording process of a digital signal recording and playback apparatus.

To achieve the above object, there is provided a digital signal recording and playback apparatus including a read/write means which records and reads digital signals to and from a digital recording medium and which relays its data to a playback circuit for reproducing digital signals read from the recording medium, which is characterized by a recording signal generating means converting analog signals to produce processed digital signals for recording and an equalizing means for amplifying those signals and compensating for their deterioration before recording.

DESCRIPTION OF THE PREFERRED EMBODIMENT

Before explaining the preferred embodiment of the present invention, a brief description is hereinafter given of the recording and playback operations of a conventional video recording and playback apparatus.

Figure 1:
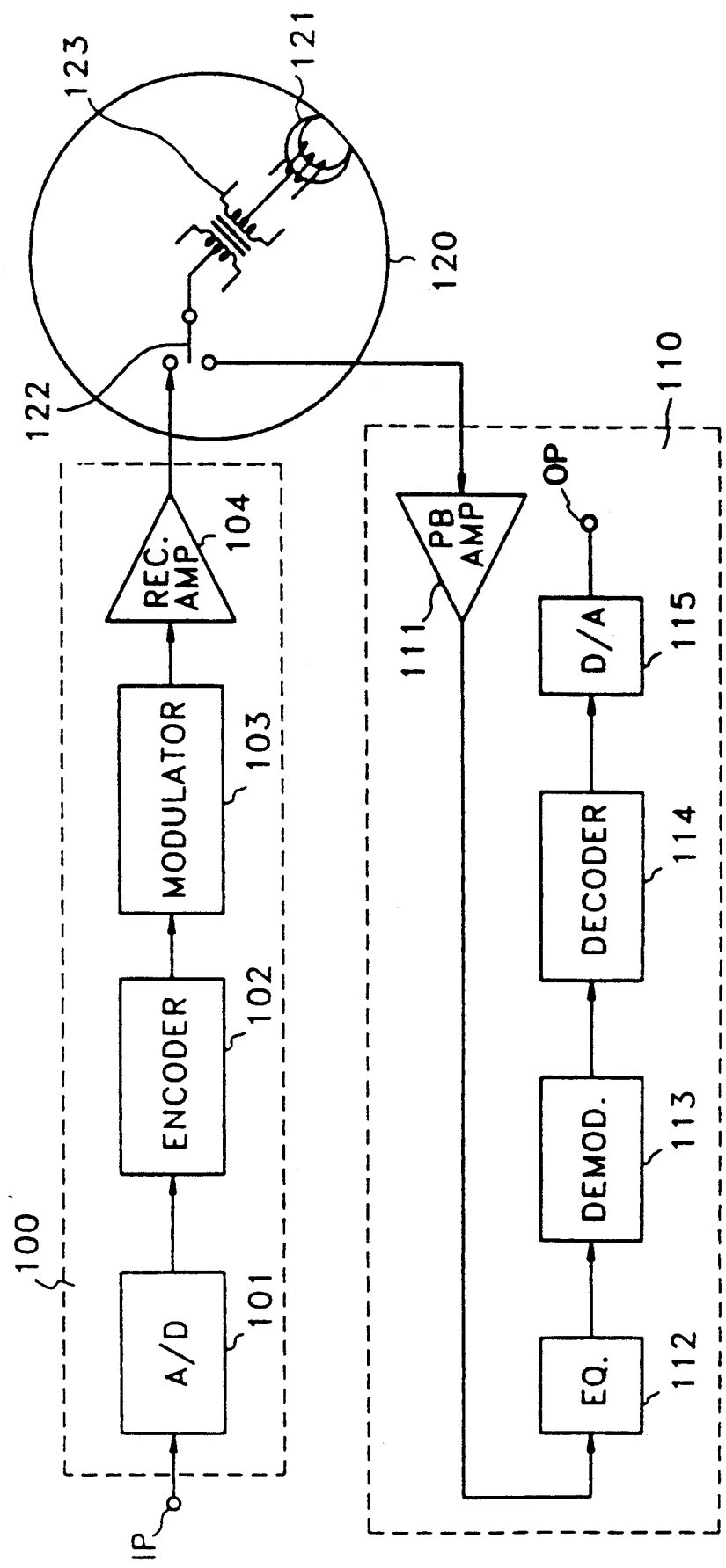
FIG. 1 is a block diagram for explaining the recording and reproducing operations of a conventional video image recording and playback apparatus.

FIG. 1 is a block diagram of a conventional digital image recording and playback apparatus.

As shown in FIG. 1, recording circuit 100 consists of an analog-to-digital converter (hereinafter referred to as A/D converter) 101, an encoder 102, a modulator 103 and a recording amplifier 104.

To explain the operation of each above block, the A/D converter 101 converts an analog image signal inputted through input terminal IP into a digital image signal, then, the encoder 102 encodes the digital image signal according to the recording format of the tape, next, the modulator 103 modulates a carrier signal with the encoded digital image signal, and lastly, the recording amplifier 104 amplifies the modulated digital image signal to the proper amplitude for recording.

Meanwhile, the playback circuit 110 consists of a playback amplifier 111, an equalizer 112, a demodulator 113, a decoder 114 and a digital-to-analog converter (hereinafter referred to as D/A converter) 115.

To further explain the operation of each above block, the playback amplifier 111 amplifies the digital image signal being reproduced to a predetermined amplitude, then, the equalizer 112 compensates for discrepancies among bits of the amplified digital image signal, next, the demodulator 113 demodulates the output of the equalizer 112, next, the decoder 114 decodes the demodulated digital image signal to recover the original digital signal and lastly, the D/A converter 115 converts the output of the decoder 114 into an analog image signal to be outputted via output terminal OP.

Video drum 120 includes a head 121, a selecting switch 122 and a rotary transformer (referred to as TPT hereinafter) 123. The drum 120 rotates at a constant velocity (speed) during recording or playback, while the head 121 either records digital image signals from the recording circuit 100 onto a recording medium such as magnetic tape, or reads a recorded digital image signal from a recording medium and supplies it to the playback circuit 110. The selecting switch 122 is directly coupled to head 121 via TPT 123 and thereby selectively connects the head 121 to either the recording amplifier 104 or the playback amplifier 111. The TPT 123 matches the impedance of the head 121 with the recording amplifier 104 or the playback amplifier 111 which are selectively connected thereto via the above selecting switch 122.

Referring now to the circuit illustrated in FIG. 1, the frequency of the modulated digital image signal at the output of modulator 103 fluctuates over a small range, thereby causing a fluctuation of the current waveform carrying the digital image signal to the head 121 via the interconnecting circuitry.

Thus, the digital image signal is deteriorated as the frequency fluctuates.

The fluctuation in the current waveform carrying the digital image signal is further intensified by the variations in the frequency response of the signal path, i.e., the head 121, the recording amplifier 104 and the TPT 123.

Consequently, during playback, the amplitude of the voltage waveform carrying the digital image signal fluctuates more than a prescribed value, raising the rate at which errors occur.

Figure 2:
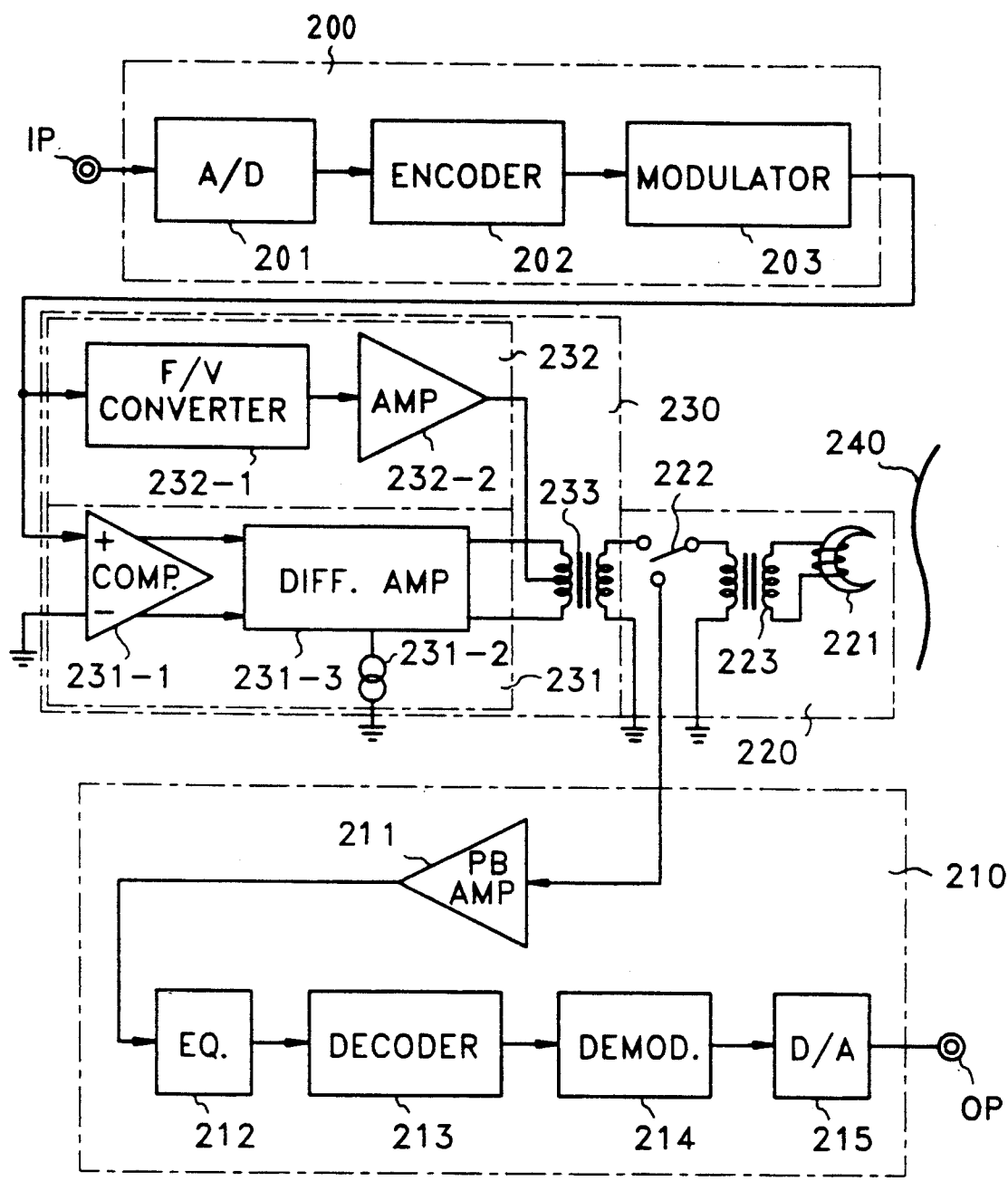
FIG. 2 is a block diagram showing one preferred embodiment of a digital signal recording circuit according to the present invention.

FIG. 2 is a circuit block diagram of one embodiment of a digital image signal recording and playback apparatus according to the present invention.

The recording signal generating circuit 200 also consists of an A/D converter 201, an encoder 202, and a modulator 203, all of which have the same function as their corresponding blocks included in recording circuit 100 in FIG. 1.

Equalizing circuit 230 consists of an amplifier 231 which amplifies and standardizes the output waveform of the recording signal generating circuit 200, a compensating circuit 232 which generates a signal required for compensating the signal deterioration caused by the frequency fluctuation at the output of the recording signal generating circuit 200, and a transformer 233 which sums the output of amplifier 231 and the output of the compensating circuit 232, and outputs the result to read/write circuit 220.

Amplifier 231 within the equalizing circuit 230 consists of a comparator 231-1 which compares the output of the recording signal generating circuit 200 with a reference voltage(GND), a constant current source 231-2 which generates a current at a constant level and a differential amplifier 231-3 which amplifies the difference between the outputs of the comparator 231-1 utilizing the output of the constant current source 231-2.

Also within the equalizing circuit 230, the compensating circuit 232 consists of a frequency-to-voltage converter (hereinafter referred to simply as F/V converter) 232-1 which converts the frequency variations at the output of the recording signal generating circuit 200 into a varying voltage and a compensation amplifier 232-2 which amplifies the output of the F/V converter 232-1.

As shown in FIG. 2, playback circuit 210 consists of a playback amplifier 211, an equalizer 212, a decoder 213, a demodulator 214 and a D/A converter 215, all of which have the same functions, individually and as a whole, as their respective counterparts in playback circuit 110 illustrated in FIG. 1, so detailed explanations will therefore be omitted.

The read/write circuit 220 consists of a TPT 223, a head 221 and a selection switch 222, all of which have the same functions as their corresponding elements in drum 120 in FIG. 1.

The reference numeral 240 in FIG. 2 denotes a magnetic recording medium such as a magnetic tape.

With reference to FIG. 2, a detailed description of the operation of the embodiment of this invention is henceforth given. The recording signal generating circuit 200 initially A/D converts analog image signals inputted via the input terminal IP, encodes them according to the recording format, and then, frequency modulates them in order to generate digital image signals for recording.

The equalizing circuit 230 receives the digital image signal from the recording signal generating circuit 200, amplifies it, compensates the deterioration according to the frequency, and then supplies the compensated signal to the read/write circuit 220.

During the recording operation, the read/write circuit 220 records the digital image signal supplied from the equalizing circuit 230 onto tape 240 which is a recording medium, and, conversely, during the playback operation, reads the digital image signal from the tape and feeds it to the playback circuit 210.

During the playback operation, the playback circuit 210 processes the digital image signal inputted from the above read/write circuit 220 and transmits a converted analog image signal to a display circuit (not shown) via the output terminal OP.

The equalizer 230 will be described in greater detail hereinafter.

The amplifier 231 wave-shapes and amplifies the digital image signal which is inputted from the recording signal generating circuit 200 and thereupon supplies both terminals of the primary winding of the transformer 233 with the amplified signal.

The comparator 231-1 initially compares the output of the recording signal generating circuit 200 with the reference voltage (GND) and then supplies the thus wave-shaped digital image signal as a square wave to the differential amplifier 231-3. The differential amplifier 231-3, supplied by the current from the constant current source 231-2, initially amplifies the square wave-standardized digital image signal from the comparator 231-1 to a current level proper for recording, and then, supplies both the primary terminals of the summing transformer 233 with the amplified signal.

Further, the compensating circuit 232 initially generates signals for deterioration compensation which vary in voltage according to the frequency fluctuation of the digital image signal from the recording signal generating circuit 200, and then, supplies those signals to the center tap of the summing transformer 233. That is, the F/V converter 232-1 converts the frequency fluctuation of the digital image signals from the recording signal generating apparatus 200 into a voltage variation to generate signals to compensate for deterioration, and the compensation amplifier 232-2 amplifies the output of the F/V converter 232-1 to a predetermined amplitude and supplies the amplified compensation signal to the center tap of the transformer 233.

Then, the summing transformer 233 regulates the amount of current supplied from the differential amplifier 231-3 in accordance with the compensation signal at the center tap and supplies the read/write circuit 220 with a standard electric potential via the secondary windings thereof.

Consequently, the summing transformer 233 acts as a signal combining element which combines the waveform-standardized and amplified digital image signal, i.e., the output of the amplifier circuit 231, and the signal for deterioration compensation, i.e., the output of the compensating circuit 232.

As described above, within a digital signal recording and playback apparatus, the present invention has such an advantage as to prevent a digital signal from being deteriorated due to frequency variations during the recording operation, and thereby prevents errors from occurring during the playback operation.

The foregoing description of the preferred embodiment of the present invention has been presented for purposes of illustration and description only.

Therefore, it is not intended to be exhaustive or to limit the invention to the precise form disclosed. Obviously, many modifications and variations will be apparent to practitioners skilled in the art. The scope of this invention is solely to be defined by the claims appended hereto and their equivalents.

What is claimed is:

1. A digital signal recording circuit, comprising:

recording signal generating means for converting an input signal into a digital signal of a format appropriate for recording on a recording medium;

equalization means for compensating deterioration in said digital signal caused by frequency variations thereof; and read/write means for recording a compensated digital signal from said equalization means onto a recording medium.

2. A digital signal recording circuit according to claim 1, wherein said read/write means further reads recorded digital signals from a recording medium, said circuit further comprising:

playback means for processing digital signals read by said read/write means into output signals for application to an output circuit.

3. A digital signal recording circuit according to claim 1, wherein said equalization means comprises:

amplifier means for wave-shaping and amplifying the digital signal from said recording signal generating means;

compensation means for generating a compensation signal as a function of frequency variations of said digital signal from said recording signal generating means; and summing means for developing said compensated digital signal by combining outputs of said amplifier means and said compensation means.

4. A digital signal recording circuit according to claim 3, wherein said amplifier means comprises:

a comparator for wave-shaping the digital signal output of said recording signal generating means;

a constant current source for generating a current of a predetermined level; and a differential amplifier for amplifying an output of said comparator using said constant current source.

5. A digital signal recording circuit according to claim 4, wherein said comparator wave-shapes said digital signal output of said recording signal generating means by comparing said digital signal output with a reference voltage.

6. A digital signal recording circuit according to claim 3, wherein said compensation means comprises:

a frequency-to-voltage (F/V) converter for converting frequency variations of said digital signal from said recording signal generating means into voltage variations to generate said compensation signal.

7. A digital signal recording circuit according to claim 3, wherein said summing means comprises a transformer having primary and secondary windings, the output of said amplifier means being connected across said primary winding and the output of said compensation means being connected to a center tap on said primary winding, and said secondary winding is connected to said read/write means.

8. A digital signal recording circuit according to claim 7, wherein said amplifier means comprises:

a comparator for wave-shaping the digital signal output of said recording signal generating means;

a constant current source for generating a current of a predetermined level; and a differential amplifier for amplifying an output of said comparator using said constant current source, and applying the result across said primary winding of said transformer.

9. A digital signal recording circuit according to claim 8, wherein said comparator wave-shapes said digital signal output of said recording signal generating means by comparing said digital signal output with a reference voltage.

10. A digital signal recording circuit according to claim 9, wherein said compensation means comprises:

a frequency-to-voltage (F/V) converter for converting frequency variations of said digital signal from said recording signal generating means into voltage variations to generate said compensation signal, and applying said compensation signal to the center tap of said primary winding of said transformer.

11. A digital signal recording circuit according to claim 10, wherein said read/write means further reads recorded digital signals from a recording medium, said circuit further comprising:

playback means for processing digital signals read by said read/write means into output signals for application to an output circuit.

* * * * *